(12) United States Patent
Pan et al.

(10) Patent No.: US 11,126,044 B1
(45) Date of Patent: Sep. 21, 2021

(54) DISPLAY DEVICE COMPRISING A FLIP CHIP FILM CONNECTED TO A CONNECTING SURFACE OF A PLURALITY OF BONDING PINS AND MANUFACTURING METHOD THEREOF

(71) Applicant: Wuhan China Star Optoelectronics Technology Co., Ltd., Wuhan (CN)

(72) Inventors: Hailong Pan, Wuhan (CN); Chao Wang, Wuhan (CN)

(73) Assignee: Wuhan China Star Optoelectronics Technology Co., Ltd., Wahan (CN)

( * ) Notice: Subject to any disclaimer, the term of this patent is extended or adjusted under 35 U.S.C. 154(b) by 139 days.

(21) Appl. No.: 16/625,795

(22) PCT Filed: Aug. 2, 2019

(86) PCT No.: PCT/CN2019/098994
§ 371 (c)(1),
(2) Date: Dec. 23, 2019

(87) PCT Pub. No.: WO2021/003784
PCT Pub. Date: Jan. 14, 2021

(30) Foreign Application Priority Data

Jul. 9, 2019 (CN) .......................... 201910616879.5

(51) Int. Cl.
*G02F 1/1345* (2006.01)
*G02F 1/1339* (2006.01)
*G02F 1/1333* (2006.01)

(52) U.S. Cl.
CPC .......... *G02F 1/1345* (2013.01); *G02F 1/1339* (2013.01); *G02F 1/13452* (2013.01); *G02F 1/13458* (2013.01); *G02F 1/133345* (2013.01)

(58) Field of Classification Search
CPC ....... G02F 2001/13398; G02F 1/13398; G02F 1/13458; H01L 23/49883; H01L 24/86; H01L 24/70
See application file for complete search history.

(56) References Cited

U.S. PATENT DOCUMENTS

| | | | | |
|---|---|---|---|---|
| 2004/0046909 | A1* | 3/2004 | Sekiguchi | G02F 1/1345 349/113 |
| 2015/0103500 | A1* | 4/2015 | Bae | H01L 24/06 361/749 |
| 2017/0358602 | A1* | 12/2017 | Bae | H01L 24/08 |
| 2018/0168044 | A1* | 6/2018 | Tsukao | G02F 1/1345 |
| 2018/0188572 | A1* | 7/2018 | Lin | H01L 24/73 |
| 2018/0190225 | A1* | 7/2018 | Chen | G02F 1/136286 |
| 2018/0263123 | A1* | 9/2018 | Chen | H05K 1/111 |

* cited by examiner

Primary Examiner — Paul C Lee

(57) ABSTRACT

A display device and a manufacturing method of the display device are provided. The display device includes a first substrate, and a flip chip film. The first substrate is provided with bonding pins, conductive adhesive layers, and barriers. Each bonding pin is extended to a side edge of the first substrate, and each bonding pin includes a connecting surface which is flush with the side edge of the first substrate. Each conductive adhesive layer covers one side of each bonding pin, each conductive adhesive layer is extended to the side edge of the first substrate, and the conductive adhesive layer includes an auxiliary connecting surface which is flush with the side edge of the first substrate. Each barrier surrounds side surfaces of each conductive adhesive layer. The flip chip film is connected to the connecting surface and the auxiliary connecting surface.

10 Claims, 4 Drawing Sheets

DISPLAY DEVICE COMPRISING A FLIP CHIP FILM CONNECTED TO A CONNECTING SURFACE OF A PLURALITY OF BONDING PINS AND MANUFACTURING METHOD THEREOF

RELATED APPLICATIONS

This application is a National Phase of PCT Patent Application No. PCT/CN2019/098994 having International filing date of Aug. 2, 2019, which claims the benefit of Chinese priority Patent Application No. 201910616879.5 filed on Jul. 9, 2019. The contents of the above applications are all incorporated by reference as if fully set forth herein in their entirety.

FIELD AND BACKGROUND OF THE INVENTION

The present invention relates to a field of display devices and in particular, to a display device and a manufacturing method thereof.

With development of display technology, flat display devices such as liquid crystal displays (LCDs) are widely used in consumer electronic products, such as mobile phones, televisions, and personal digital assistants, digital cameras, notebook computers, and desktop computers, due to their high image quality, power saving, being thin, and a wide application range. LCDs have become mainstream in display devices.

Most of the LCD devices on the market are backlight-type LCDs which include an LCD panel and a backlight module. The working principle of the LCD panel is as follows. Liquid crystal molecules are placed between two parallel glass substrates, and there are many vertical and horizontal thin wires arranged between the two glass substrates. An electrical current is applied to the liquid crystal molecules to control their orientations, and light of the backlight module is refracted out to generate an image.

Generally, an LCD panel comprises a color filter (CF) substrate, an array substrate (thin film transistor, i.e., TFT), liquid crystals (LC) disposed between the CF substrate and the TFT substrate, and a sealant. The working principle is to control rotation of the liquid crystal molecules in a liquid crystal layer by applying a driving voltage to the two glass substrates, and refract light of the backlight module to generate an image.

Further, a voltage and a control signal required for driving pixels of the LCD panel are all from an external driving circuit board, and are transmitted from the driving circuit board to the LCD panel through a chip on film (COF). A conventional method of bonding the COF is to form a plurality of bonding pins on an upper surface of the array substrate and bond the COF to the bonding pins. However, a border area of the display panel is occupied because the bonding structure bonds the COF to the upper surface of the array substrate. This does not meet the demands of the narrow bezel trend of display panels. In solution, prior arts use a side bonding technology, in which the COF is bonded to a lateral side of the array substrate. Specifically, a silver connection layer (Ag pad) is formed on lateral surfaces of the array substrate and the CF substrate. The silver connection layer is in contact with outer surfaces of the bonding pins, and the COF passes through a silver connection layer to connect the bonding pins. However, a thickness of the bonding pin is very thin (usually 1 μm), a contact area between the silver connection layer and the bonding pin is small, the electrical conductivity is poor, and most of the silver connection layer even adheres the glass substrate, so the silver connection layer has an insufficient pulling force, which leads to detachment.

SUMMARY OF THE INVENTION

It is an objective of the present invention to provide a display device to improve electrical conductivity and bonding stability of a side surface of a flip chip film.

It is an objective of the present invention to provide a manufacturing method of a display device to improve electrical conductivity and bonding stability of a side surface of a flip chip film.

Accordingly, the present invention provides a display device, comprising:

a first substrate;

a second substrate; and a flip chip film;

wherein the first substrate is disposed corresponding to the second substrate; the first substrate is provided with a plurality of bonding pins, a plurality of conductive adhesive layers, a plurality of barriers, and a sealant; the bonding pins are disposed spaced apart from each other and disposed on one side of the first substrate facing the second substrate, each of the bonding pins is extended to a side edge of the first substrate, and each bonding pin comprises a connecting surface which is a side surface flush with the side edge of the first substrate;

wherein each of the conductive adhesive layers is disposed corresponding to each of the bonding pins, each of the conductive adhesive layers at least covers a portion of one side of each of the bonding pins away from the first substrate, each of the conductive adhesive layers is extended to the side edge of the first substrate, and the conductive adhesive layer comprises an auxiliary connecting surface which is a side surface flush with the side edge of the first substrate;

wherein each of the barriers is disposed corresponding to each of the conductive adhesive layers, and each of the barriers surrounds side surfaces of each of the conductive adhesive layers except the auxiliary connecting surface;

wherein the sealant is connected to the first substrate and the second substrate, and the sealant is spaced apart from the conductive adhesive layer by the barrier; and wherein the flip chip film is connected to the connecting surface and the auxiliary connecting surface.

The flip chip film is connected to the connecting surface and the auxiliary connecting surface and then bent to one side of the first substrate away from the second substrate.

A connecting layer covers the connecting surface and the auxiliary connecting surface, and the flip chip film is connected to the connecting surface and the auxiliary connecting surface through the connecting layer.

An extending width of each of the auxiliary connecting surfaces along the side edge of the first substrate is greater than or equal to an extending width of a corresponding one of the connecting surfaces along the side edge of the first substrate.

Material of the conductive adhesive layer comprises a silver adhesive, and material of the connecting layer comprises silver.

The present invention provides a manufacturing method of a display device, comprising following steps:

step S1: providing a first substrate, wherein a plurality of bonding pins spaced apart from each other are formed on the first substrate, each of the bonding pins is extended to a side edge of the first substrate, and each of the bonding pin comprises a connecting surface which is a side surface flush with the side edge of the first substrate;

step S2: forming a plurality of barriers on the first substrate, wherein the barriers are disposed corresponding to the bonding pins;

step S3: applying a sealant on the first substrate, wherein the sealant is disposed outside the barriers;

step S4: applying a conductive adhesive inside each of the barriers to form a conductive adhesive layer inside each barrier, wherein each conductive adhesive layer at least covers a portion of one side of each bonding pin away from the first substrate, each conductive adhesive layer is extended to the side edge of the first substrate, the conductive adhesive layer comprises an auxiliary connecting surface which is a side surface flush with the side edge of the first substrate, and each barrier surrounds side surfaces of each conductive adhesive layer except the auxiliary connecting surface;

step S5: providing a second substrate and assembling the second substrate and the first substrate in a manner such that the second substrate is disposed corresponding to the first substrate and connected by the sealant; and step S6: providing a flip chip film and connecting the flip chip film to the connecting surface and the auxiliary connecting surface.

Step S6 further comprises bending the flip chip film to one side of the first substrate away from the second substrate.

Between step S5 and step S6, the manufacturing method further comprises covering the connecting surface and the auxiliary connecting surface with a connecting layer; and in step S6, the flip chip film is connected to the connecting surface and the auxiliary connecting surface through the connecting layer.

An extending width of each of the auxiliary connecting surfaces along the side edge of the first substrate is greater than or equal to an extending width of each of the connecting surfaces along the side edge of the first substrate.

Material of the conductive adhesive layer comprises a silver adhesive, and material of the connecting layer comprises silver.

Advantages of the present invention: The present invention provides a display device. The display device comprises a first substrate, a second substrate, and a flip chip film. The first substrate is disposed corresponding to the second substrate; the first substrate is provided with a plurality of bonding pins, a plurality of conductive adhesive layers, a plurality of barriers, and a sealant; the bonding pins are disposed spaced apart from each other and disposed on one side of the first substrate facing the second substrate, each of the bonding pins is extended to a side edge of the first substrate, and each bonding pin comprises a connecting surface which is a side surface flush with the side edge of the first substrate. Each of the conductive adhesive layers is disposed corresponding to each of the bonding pins, each of the conductive adhesive layers at least covers a portion of one side of each of the bonding pins away from the first substrate, each of the conductive adhesive layers is extended to the side edge of the first substrate, and the conductive adhesive layer comprises an auxiliary connecting surface which is a side surface flush with the side edge of the first substrate. Each of the barriers is disposed corresponding to each of the conductive adhesive layers, and each of the barriers surrounds side surfaces of each of the conductive adhesive layers except the auxiliary connecting surface. The sealant is connected to the first substrate and the second substrate, and the sealant is spaced apart from the conductive adhesive layer by the barrier. The flip chip film is connected to the connecting surface and the auxiliary connecting surface. Accordingly, a contact area between the flip chip film and the bonding pin can be increased, and electrical conductivity and bonding stability of a side surface of the flip chip film are improved. The present invention also provides a manufacturing method of the display device, which can improve the electrical conductivity and bonding stability of the side surface of the flip chip film.

BRIEF DESCRIPTION OF THE SEVERAL VIEW OF THE DRAWINGS

The following detailed description and the accompanying drawings are provided to ease understanding of the features and technical contents of the present invention. The accompanying drawings are provided for illustrative purposes only and are not intended to limit the present invention.

DESCRIPTION OF SPECIFIC EMBODIMENTS OF THE INVENTION

Figure 1:
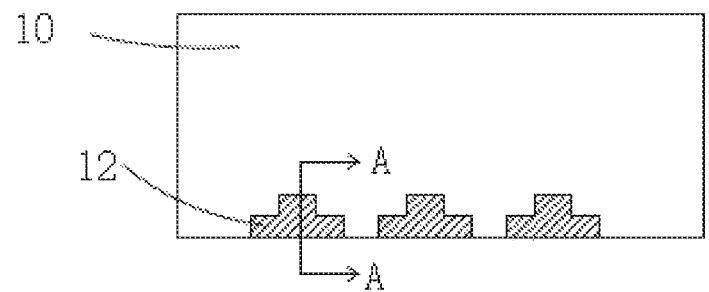
FIG. 1 is a schematic view illustrating step S1 in a manufacturing method of a display device according to the present invention.

In order to further clarify the technical solutions and effects of the present invention, the following detailed description is provided in conjunction with the preferable embodiments of the present invention and the accompanying drawings.

Referring to FIGS. 1 to 9, the present invention provides a display device. The display device comprises:

a first substrate 10, a second substrate 20, and a flip chip film 30;

wherein the first substrate 10 is disposed corresponding to the second substrate 20; the first substrate 10 is provided with a plurality of bonding pins 12, a plurality of conductive adhesive layers 13, a plurality of barriers 14, and a sealant 15; the bonding pins 12 are disposed spaced apart from each other and disposed on one side of the first substrate 10 facing the second substrate 12, each of the bonding pins 12 is extended to a side edge of the first substrate 10, and each bonding pin 12 comprises a connecting surface 121 which is a side surface flush with the side edge of the first substrate 10;

wherein each of the conductive adhesive layers 13 is disposed corresponding to each of the bonding pins 12, each of the conductive adhesive layers 13 at least covers a portion of one side of each of the bonding pins 12 away from the first substrate 10, each of the conductive adhesive layers 13 is extended to the side edge of the first substrate 10, and the conductive adhesive layer 13 comprises an auxiliary connecting surface 131 which is a side surface flush with the side edge of the first substrate 10;

wherein each of the barriers 14 is disposed corresponding to each of the conductive adhesive layers 13, and each of the barriers 14 surrounds side surfaces of each of the conductive adhesive layers 13 except the auxiliary connecting surface 131;

wherein the sealant 15 is connected to the first substrate 10 and the second substrate 20, and the sealant 15 is spaced apart from the conductive adhesive layer 13 by the barrier 14; and wherein the flip chip film 30 is connected to the connecting surface 121 and the auxiliary connecting surface 131.

According to one embodiment of the present invention, the flip chip film 30 is connected to the connecting surface 121 and the auxiliary connecting surface 131 and then bent to one side of the first substrate 10 away from the second substrate 20.

According to one embodiment of the present invention, a connecting layer 40 covers the connecting surface 121 and the auxiliary connecting surface 131, and the flip chip film 30 is connected to the connecting surface 121 and the auxiliary connecting surface 131 through the connecting layer 40.

An extending width of each of the auxiliary connecting surfaces 131 along the side edge of the first substrate 10 is greater than or equal to an extending width of a corresponding one of the connecting surfaces 121 along the side edge of the first substrate 10.

According to one embodiment of the present invention, material of the conductive adhesive layer 13 comprises a silver adhesive, and material of the connecting layer 40 comprises silver.

Moreover, material of the bonding pins 12 is indium tin oxide.

Preferably, a height of the connecting surface 121 is 1 μm, and a height of the auxiliary connecting surface 131 is 2 μm.

Preferably, the display device is a liquid crystal display device, the first substrate 10 is an array substrate, and a TFT array and a pixel electrode electrically connected to the TFT array are disposed on the first substrate 10. The second substrate 20 is a color filter substrate. A black matrix and a color filter are disposed on the second substrate 20. A liquid crystal layer is disposed between the first substrate 10 and the second substrate 20.

Figure 5:
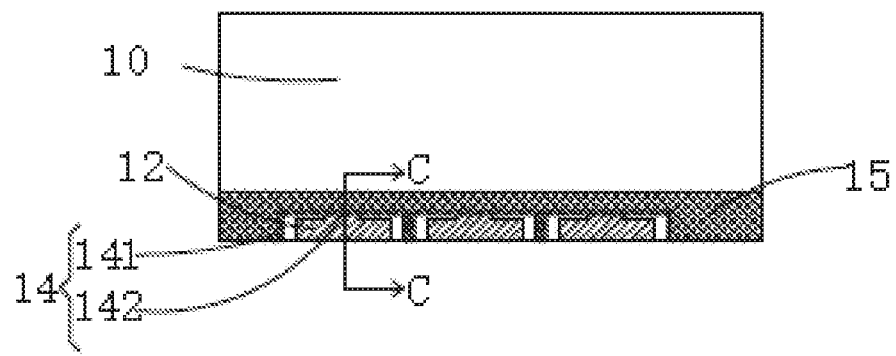
FIG. 5 is a schematic view illustrating step S3 in the manufacturing method of the display device according to the present invention.
Figure 6:
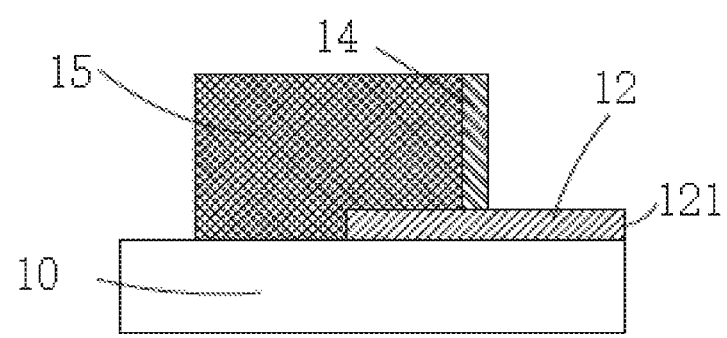
FIG. 6 is a cross-sectional view taken along line C-C of FIG. 5.
Figure 7:
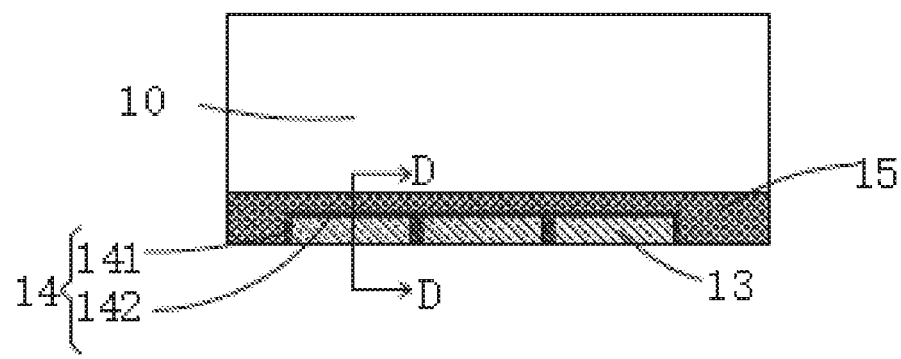
FIG. 7 is a schematic view illustrating step S4 in the manufacturing method of the display device according to the present invention.

As shown in FIGS. 5 to 7, in some embodiments of the present invention, the barrier 14 is in a U-like shape, and each barrier 14 includes two first extending portions 141 at two sides of the bonding pin 12 and also includes a second extending portion 142 connected to the two first extending portions 141, wherein the first extending portions 141 are parallel to an extending direction of the bonding pin 12, the second extending portion 142 is perpendicular to the extending direction of the bonding pin 12, the two first extending portions 141 are spaced apart from the corresponding bonding pin 12, two side portions of the second extending portion 142 are extended outside the corresponding bonding pin 12, and a middle portion of the second extending portion 142 is stacked on the corresponding bonding pin 12.

Furthermore, one side of the second substrate 20 facing the first substrate 10 is in contact with a surface of the barrier 14 facing the second substrate 20 and a surface of the conductive adhesive layer 13 facing the second substrate 20.

In detail, the connecting layer 40 covers outer side surfaces of the first substrate 10 and the second substrate 20, which are flush with the connecting surface 121.

In the present invention, the sealant 15 is blocked by using the barrier 14, a conductive adhesive layer 13 is formed inside the barrier 14, and the connecting layer 40 simultaneously covers the auxiliary connecting surface 131 of the conductive adhesive layer 13 and the connecting surface 121 of the bonding pin 12. Accordingly, electrical conductivity between the flip chip film 30 and the bonding pin 121 is improved, a pulling force of the connecting layer 40 is increased, bonding stability is improved, and the components are prevented from detachment/falling off.

Figure 2:
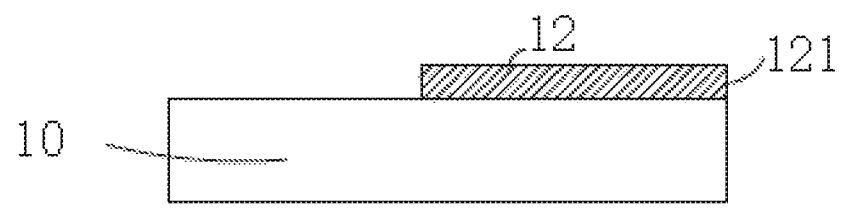
FIG. 2 is a cross-sectional view taken along line A-A of FIG. 1.
Figure 3:
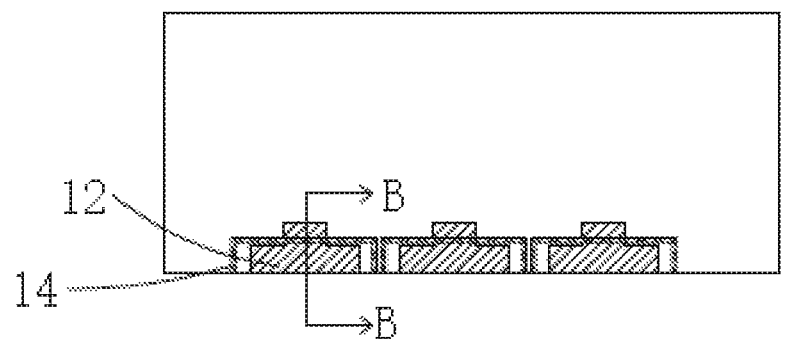
FIG. 3 is a schematic view illustrating step S2 in the manufacturing method of the display device according to the present invention.
Figure 4:
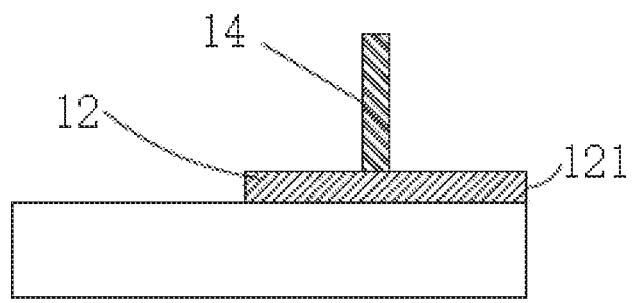
FIG. 4 is a cross-sectional view taken along line B-B of FIG. 3.
Figure 8:
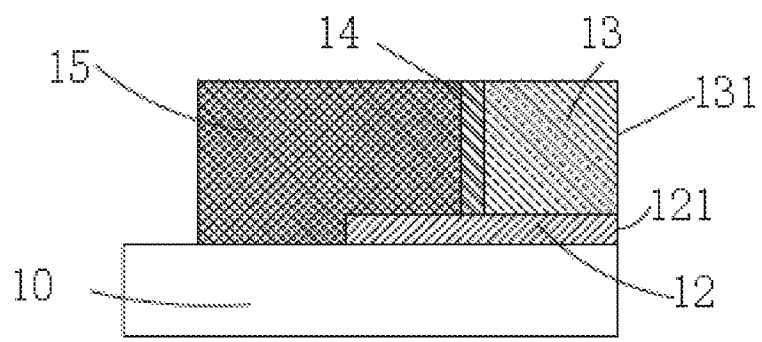
FIG. 8 is a cross-sectional view taken along line D-D of FIG. 7.
Figure 9:
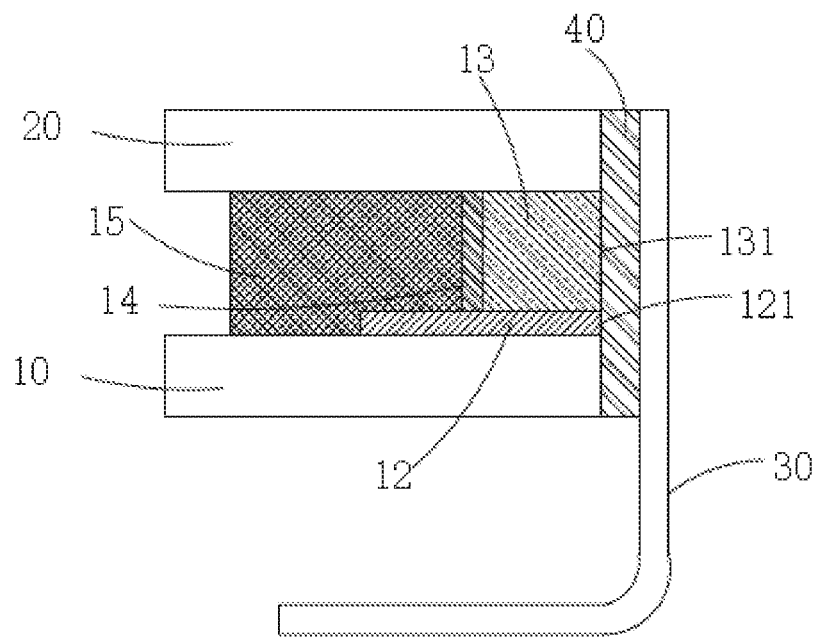
FIG. 9 is a schematic view illustrating step S5 and step S6 in the manufacturing method of the display device according to the present invention.
Figure 10:
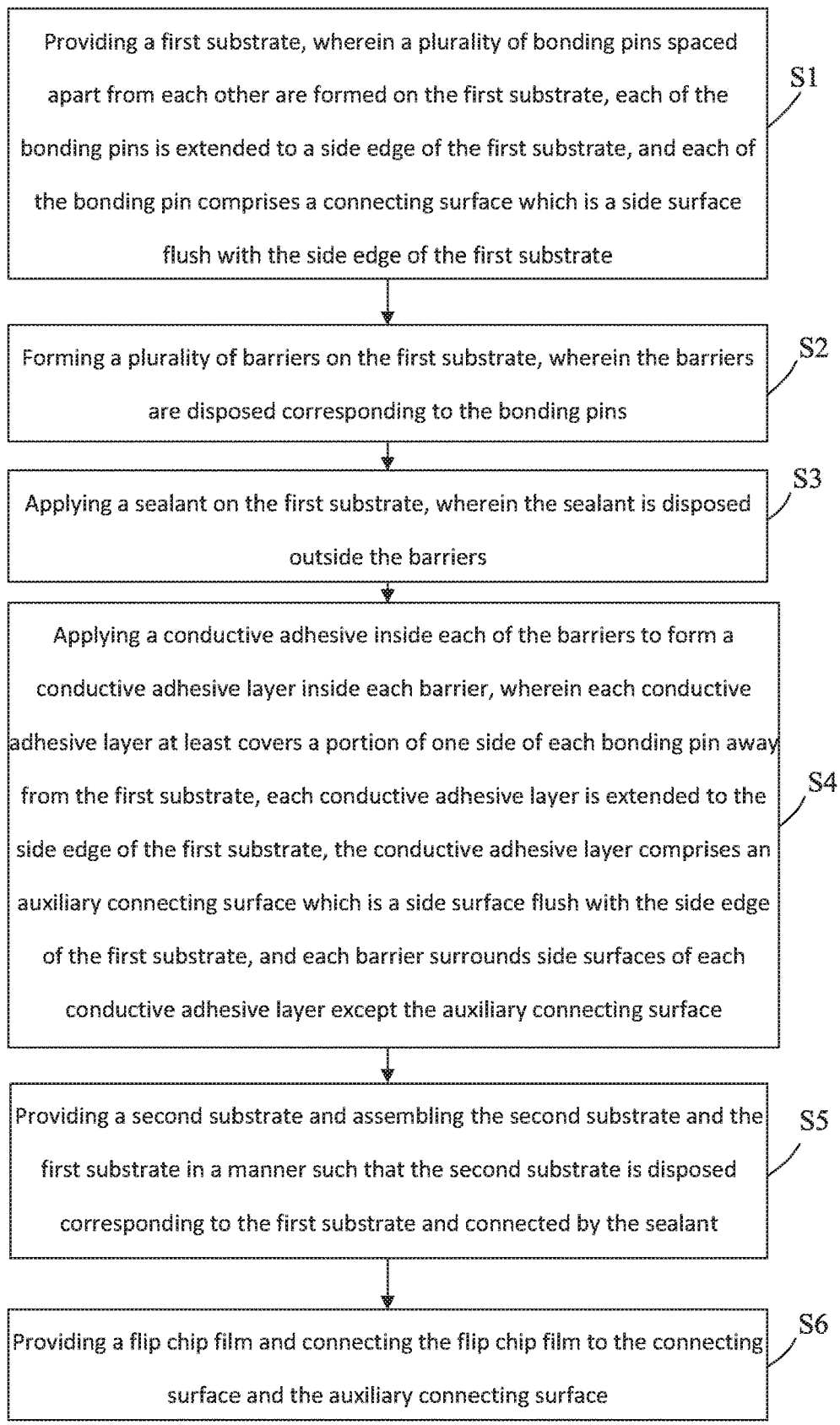
FIG. 10 is a process flow diagram illustrating the manufacturing method of the display device according to the present invention.

Referring to FIG. 10, the present invention further provides a manufacturing method of a display device, comprising following steps:

step S1: as shown in FIGS. 1 and 2, providing a first substrate 10, wherein a plurality of bonding pins 112 spaced apart from each other are formed on the first substrate 10, each of the bonding pins 12 is extended to a side edge of the first substrate 10, and each of the bonding pin 12 comprises a connecting surface 121 which is a side surface flush with the side edge of the first substrate 121;

step S2: as shown in FIGS. 3 and 4, forming a plurality of barriers 14 on the first substrate 10, wherein the barriers 14 are disposed corresponding to the bonding pins 12;

step S3: as shown in FIGS. 5 and 6, applying a sealant 15 on the first substrate 10, wherein the sealant 15 is disposed outside the barriers 14;

step S4: as shown in FIGS. 7 and 8, applying a conductive adhesive inside each of the barriers 14 to form a conductive adhesive layer 13 inside each barrier 14, wherein each conductive adhesive layer 13 at least covers a portion of a side surface of each bonding pin 12 away from the first substrate 10, and each conductive adhesive layer 13 is extended to the side edge of the first substrate 10, the conductive adhesive layer 13 comprises an auxiliary connecting surface 131 which is a side surface flush with the side edge of the first substrate 10, and each barrier 14 surrounds side surfaces of each conductive adhesive layer 13 except the auxiliary connecting surface 131;

step S5: as shown in FIG. 9, providing a second substrate 20 and assembling the second substrate 20 and the first substrate 10 in a manner such that the second substrate 20 is disposed corresponding to the first substrate 10 and connected by the sealant 15; and step S6: as shown in FIG. 9, providing a flip chip film 30 and connecting the flip chip film 30 to the connecting surface 121 and the auxiliary connecting surface 131.

According to one embodiment of the present invention, step S6 further comprises bending the flip chip film 30 to one side of the first substrate 10 away from the second substrate 20.

According to one embodiment of the present invention, between step S5 and step S6, the manufacturing method further comprises covering the connecting surface 121 and the auxiliary connecting surface 131 with a connecting layer 40; and in step S6, the flip chip film 30 is connected to the connecting surface 121 and the auxiliary connecting surface 131 through the connecting layer 40.

According to one embodiment of the present invention, an extending width of each of the auxiliary connecting surfaces 131 along the side edge of the first substrate 10 is greater than or equal to an extending width of each of the connecting surfaces 121 along the side edge of the first substrate 10.

According to one embodiment of the present invention, material of the conductive adhesive layer 13 comprises a silver adhesive, and material of the connecting layer 40 comprises silver.

Preferably, a height of the connecting surface 121 is 1 μm, and a height of the auxiliary connecting surface 131 is 2 μm.

Moreover, material of the bonding pins 12 is indium tin oxide.

Preferably, the display device is a liquid crystal display device, the first substrate 10 is an array substrate, and a TFT array and a pixel electrode electrically connected to the TFT array are disposed on the first substrate 10. The second substrate 20 is a color filter substrate. A black matrix and a color filter are disposed on the second substrate 20. A liquid crystal layer is disposed between the first substrate 10 and the second substrate 20.

As shown in FIGS. 5 to 7, in some embodiments of the present invention, the barrier 14 is in a U-like shape, and each barrier 14 includes two first extending portions 141 at two sides of the bonding pin 12 and also includes a second extending portion 142 connected to the two first extending portions 141, wherein the first extending portions 141 are parallel to an extending direction of the bonding pin 12, the second extending portion 142 is perpendicular to the extending direction of the bonding pin 12, the two first extending portions 141 are spaced apart from the corresponding bonding pin 12, two side portions of the second extending portion 142 are disposed outside the corresponding bonding pin 12, and a middle portion of the second extending portion 142 is stacked on the corresponding bonding pin 12.

Furthermore, one side of the second substrate 20 facing the first substrate 10 is in contact with a surface of the barrier 14 facing the second substrate 20 and a surface of the conductive adhesive layer 13 facing the second substrate 20.

Specifically, in step S2, due to the presence of the barrier 14, the sealant 15 is blocked at a periphery of the barrier 14 during the sealant applying process, thereby providing a space for applying the conductive adhesive layer 13. That is, the conductive adhesive layer 13 is applied inside the barrier 14.

Further, the connecting layer 40 further covers outer side surfaces of the first substrate 10 and the second substrate 20 that are flush with the connecting surface 121.

In the present invention, the sealant 15 is blocked by the barrier 14, a conductive adhesive layer 13 is formed inside the barrier 14, and the connecting layer 40 simultaneously covers the auxiliary connecting surface 131 of the conductive adhesive layer 13 and the connecting surface 121 of the bonding pin 12. Accordingly, electrical conductivity between the flip chip film 30 and the bonding pin 121 is improved, a pulling force of the connecting layer 40 is increased, bonding stability is improved, and the components are prevented from detachment/falling off.

In summary, the present invention provides a display device. The display device comprises a first substrate, a second substrate, and a flip chip film. The first substrate is disposed corresponding to the second substrate; the first substrate is provided with a plurality of bonding pins, a plurality of conductive adhesive layers, a plurality of barriers, and a sealant; the bonding pins are disposed spaced apart from each other and disposed on one side of the first substrate facing the second substrate, each of the bonding pins is extended to a side edge of the first substrate, and each bonding pin comprises a connecting surface which is a side surface flush with the side edge of the first substrate. Each of the conductive adhesive layers is disposed corresponding to each of the bonding pins, each of the conductive adhesive layers at least covers a portion of one side of each of the bonding pins away from the first substrate, each of the conductive adhesive layers is extended to the side edge of the first substrate, and the conductive adhesive layer comprises an auxiliary connecting surface which is a side surface flush with the side edge of the first substrate. Each of the barriers is disposed corresponding to each of the conductive adhesive layers, and each of the barriers surrounds side surfaces of each of the conductive adhesive layers except the auxiliary connecting surface. The sealant is connected to the first substrate and the second substrate, and the sealant is spaced apart from the conductive adhesive layer by the barrier. The flip chip film is connected to the connecting surface and the auxiliary connecting surface. Accordingly, a contact area between the flip chip film and the bonding pin can be increased, and electrical conductivity and bonding stability of a side surface of the flip chip film are improved. The present invention also provides a manufacturing method of the display device, which can improve the electrical conductivity and bonding stability of the side surface of the flip chip film.

It is obvious that various changes and modifications can be made by persons of ordinary skills in the art in accordance with the technical solutions and technical concept of the present invention, and all such changes and modifications are deemed to be within the protection scope of the claims of the present invention.

What is claimed is:
1. A display device, comprising:
a first substrate;
a second substrate; and
a flip chip film;
wherein the first substrate is disposed corresponding to the second substrate; the first substrate is provided with a plurality of bonding pins, a plurality of conductive adhesive layers, a plurality of barriers, and a sealant; the bonding pins are disposed spaced apart from each other and disposed on one side of the first substrate facing the second substrate, each of the bonding pins is extended to a side edge of the first substrate, and each bonding pin comprises a connecting surface which is a side surface flush with the side edge of the first substrate;
wherein each of the conductive adhesive layers is disposed corresponding to each of the bonding pins, each of the conductive adhesive layers at least covers a portion of one side of each of the bonding pins away from the first substrate, each of the conductive adhesive layers is extended to the side edge of the first substrate, and the conductive adhesive layer comprises an auxiliary connecting surface which is a side surface flush with the side edge of the first substrate;
wherein each of the barriers is disposed corresponding to each of the conductive adhesive layers, and each of the barriers surrounds side surfaces of each of the conductive adhesive layers except the auxiliary connecting surface;
wherein the sealant is connected to the first substrate and the second substrate, and the sealant is spaced apart from the conductive adhesive layer by the barrier; and
wherein the flip chip film is connected to the connecting surface and the auxiliary connecting surface.
2. The display device according to claim 1, wherein the flip chip film is connected to the connecting surface and the auxiliary connecting surface and then bent to one side of the first substrate away from the second substrate.

3. The display device according to claim 1, wherein a connecting layer covers the connecting surface and the auxiliary connecting surface, and the flip chip film is connected to the connecting surface and the auxiliary connecting surface through the connecting layer.

4. The display device according to claim 1, wherein an extending width of each of the auxiliary connecting surfaces along the side edge of the first substrate is greater than or equal to an extending width of a corresponding one of the connecting surfaces along the side edge of the first substrate.

5. The display device according to claim 3, wherein material of the conductive adhesive layer comprises a silver adhesive, and material of the connecting layer comprises silver.

6. A manufacturing method of a display device, comprising following steps:
- step S1: providing a first substrate, wherein a plurality of bonding pins spaced apart from each other are formed on the first substrate, each of the bonding pins is extended to a side edge of the first substrate, and each of the bonding pin comprises a connecting surface which is a side surface flush with the side edge of the first substrate;
- step S2: forming a plurality of barriers on the first substrate, wherein the barriers are disposed corresponding to the bonding pins;
- step S3: applying a sealant on the first substrate, wherein the sealant is disposed outside the barriers;
- step S4: applying a conductive adhesive inside each of the barriers to form a conductive adhesive layer inside each barrier, wherein each conductive adhesive layer at least covers a portion of one side of each bonding pin away from the first substrate, each conductive adhesive layer is extended to the side edge of the first substrate, the conductive adhesive layer comprises an auxiliary connecting surface which is a side surface flush with the side edge of the first substrate, and each barrier surrounds side surfaces of each conductive adhesive layer except the auxiliary connecting surface;
- step S5: providing a second substrate and assembling the second substrate and the first substrate in a manner such that the second substrate is disposed corresponding to the first substrate and connected by the sealant; and
- step S6: providing a flip chip film and connecting the flip chip film to the connecting surface and the auxiliary connecting surface.

7. The manufacturing method of the display device according to claim 6, wherein step S6 further comprises bending the flip chip film to one side of the first substrate away from the second substrate.

8. The manufacturing method of the display device according to claim 6, wherein between step S5 and step S6, the manufacturing method further comprises covering the connecting surface and the auxiliary connecting surface with a connecting layer; and in step S6, the flip chip film is connected to the connecting surface and the auxiliary connecting surface through the connecting layer.

9. The manufacturing method of the display device according to claim 6, wherein an extending width of each of the auxiliary connecting surfaces along the side edge of the first substrate is greater than or equal to an extending width of each of the connecting surfaces along the side edge of the first substrate.

10. The manufacturing method of the display device according to claim 8, wherein material of the conductive adhesive layer comprises a silver adhesive, and material of the connecting layer comprises silver.

* * * * *